United States Patent
Ogikubo

(10) Patent No.: US 7,099,239 B2
(45) Date of Patent: Aug. 29, 2006

(54) INFORMATION RECORD AND PLAYBACK APPARATUS AND COMPUTER PROGRAM HAVING A RESUME FUNCTION BASED ON RECORDED PLAYBACK STOP POSITION INFORMATION

(75) Inventor: Takahiko Ogikubo, Saitama (JP)

(73) Assignee: Pioneer Corporation, Tokyo (JP)

( * ) Notice: Subject to any disclaimer, the term of this patent is extended or adjusted under 35 U.S.C. 154(b) by 564 days.

(21) Appl. No.: 10/231,468

(22) Filed: Aug. 30, 2002

(65) Prior Publication Data

US 2003/0063528 A1    Apr. 3, 2003

(30) Foreign Application Priority Data

Sep. 3, 2001   (JP) ............................ P2001-266458

(51) Int. Cl.
   *G11B 21/08*   (2006.01)
(52) U.S. Cl. ............................... 369/30.23; 369/30.24
(58) Field of Classification Search ............. 369/30.24, 369/30.23, 30.36, 47.32, 47.33, 47.34; 386/45, 386/125, 126; 711/3, 4, 102, 103, 104, 105, 711/111; 710/52, 53
   See application file for complete search history.

(56) References Cited

U.S. PATENT DOCUMENTS

| | | | | |
|---|---|---|---|---|
| 5,063,547 A | | 11/1991 | Custers et al. | |
| 5,365,502 A | * | 11/1994 | Misono | 369/30.24 |
| 5,457,672 A | * | 10/1995 | Shinada et al. | 369/30.24 |
| 5,831,946 A | * | 11/1998 | De Bie | 369/30.36 |
| 5,999,694 A | * | 12/1999 | Yasuda et al. | 386/70 |
| 6,388,961 B1 | * | 5/2002 | Ijichi | 369/30.36 |
| 6,532,334 B1 | * | 3/2003 | Kikuchi et al. | 386/68 |
| 6,570,837 B1 | * | 5/2003 | Kikuchi et al. | 369/275.1 |

FOREIGN PATENT DOCUMENTS

| | | |
|---|---|---|
| EP | 1 059 635 A2 | 12/2000 |
| JP | 11-146327 | 5/1999 |
| JP | 2000-331466 | 11/2000 |

OTHER PUBLICATIONS

Japanese Abstract No. 11146327, dated May 28, 1999.

* cited by examiner

*Primary Examiner*—Tan Dinh
(74) *Attorney, Agent, or Firm*—Sughrue Mion, PLLC

(57) ABSTRACT

An information record and playback apparatus has a user information acquisition unit for acquiring user information of the user using the apparatus at present; a record unit for recording the acquired user information and playback stop position information on a record medium in relation to each other; and a playback start control unit for selecting the playback stop position information corresponding to the acquired user information from among the playback stop position information read from the record medium and resuming playing back the record medium based on the selected playback stop position information.

9 Claims, 4 Drawing Sheets

| USER INFORMATION | RESUME INFORMATION | DATE AND TIME INFORMATION |
|---|---|---|
| A | "2AFF" | 2001/05/05  19:03 |
| B | "3C00" | 2001/01/30  21:25 |
| C | "404B" | 2000/12/25  10:33 |
| ....... | ....... | ....... |
| ....... | ....... | ....... |

*FIG. 5A* (SELECTION SCREEN 1)

SELECT PLAYBACK METHOD

➡ 1. NORMAL PLAYBACK

2. RESUME PLAYBACK
      (RESUME INFORMATION OF LAST USER)

*FIG. 5B* (SELECTION SCREEN 2)

SELECT PLAYBACK METHOD

1. NORMAL PLAYBACK

➡ 2. RESUME PLAYBACK
      (RESUME INFORMATION OF USER USING APPARATUS)

3. RESUME PLAYBACK
      (RESUME INFORMATION OF LAST USER)

*FIG. 5C* (SELECTION SCREEN 3)

SELECT PLAYBACK METHOD

1. NORMAL PLAYBACK

➡ 2. RESUME PLAYBACK
      (RESUME INFORMATION OF USER USING APPARATUS)

tion is described in JP-A-2000-331466, for example.

INFORMATION RECORD AND PLAYBACK APPARATUS AND COMPUTER PROGRAM HAVING A RESUME FUNCTION BASED ON RECORDED PLAYBACK STOP POSITION INFORMATION

CROSS REFERENCE OF RELATED APPLICATION

This application is based on and claims priority under 35 U.S.C. §119 with respect to Japanese Patent Application No. 2001-266458 filed on Sep. 3, 2001, the entire content of which is incorporated herein by reference.

BACKGROUND OF THE INVENTION

1. Field of the Invention

This invention belongs to the field of an information record and playback apparatus for record media such as optical disks and in particular to an information record land playback apparatus having a resume function of recording playback stop position information on a record medium when playback stops and resuming playback at the playback stop position at the playback start time.

2. Description of the Related Art

Known as an information record and playback apparatus with optical disks such as a DVD (Digital Versatile Disk) as record media is an apparatus having a resume function of memorizing playback stop position information when the apparatus is powered off or when playback stops and starting playback at the previous playback stop position at the playback restart time.

Hitherto, when the user stopped playing back an information record medium such as an optical disk, playback stop position information indicating the playback stop position, which will also be hereinafter referred to as resume information, has been recorded in internal memory, etc., of the information record and playback apparatus together with the identification information, etc., of the disk. Therefore, if the user borrows or lends an optical disk from or to another person, the user does not refer to the resume information of the person so long as the user uses his or her own information record and playback apparatus. Such an information record and playback apparatus comprising the resume function is described in JP-A-2000-331466, for example.

On the other hand, an apparatus for recording such resume information on an optical disk is proposed in JP-A-11-146327, etc., for example. In this case, as an optical disk is borrowed or lent, the resume information of another person is referred. That is, if one person plays back an optical disk borrowed from another person, the optical disk is played back starting at the position at which the owner of the optical disk previously stopped playing back the optical disk. Further, the position at which the person borrowing the optical disk stops playing back the borrowed optical disk is recorded on the optical disk as resume information and consequently the inconvenience of rewriting the resume information of the owner of the optical disk occurs.

SUMMARY OF THE INVENTION

It is therefore an object of the invention to provide an information record and playback apparatus having a resume function wherein user information is used to manage resume information for each user, thereby inhibiting reference to the resume information of any other person occurring as a record medium is lent or borrowed.

According to one aspect of the invention, there is provided an information record and playback apparatus comprising user information acquisition means for acquiring user information of the user using the apparatus at present; record means for recording the acquired user information and playback stop position information on a record medium on the record medium in relation to each other; and playback start control means for selecting the playback stop position information corresponding to the acquired user information from among the playback stop position information read from the record medium and resuming playing back the record medium based on the selected playback stop position information.

According to the described information record and playback apparatus, when the user uses the information record and playback apparatus, the user information of the user using the apparatus at present is acquired. When the user plays back information on the record medium and stops playing back the record medium, the playback stop position information is acquired and is recorded on the record medium in relation to the acquired user information. On the other hand, when playing back the record medium is started, the playback stop position information is read from the record medium and playing back the record medium is started based on the playback stop position information corresponding to the acquired user information. Thus, if a plurality of users use the same record medium, the inconvenience of automatically playing back the record medium based on the playback stop position information of any other user or rewriting the playback stop position information of any other user can be prevented.

In one mode of the described information record and playback apparatus, if the playback stop position information corresponding to the user using the apparatus is recorded on the record medium at the playback stop time, the record means updates the playback stop position information.

According to the mode, if a plurality of users use the same record medium, the playback stop position information is recorded and updated for each user.

In another mode of the described information record and playback apparatus, if the playback stop position information corresponding to the user using the apparatus is not recorded on the record medium at the playback stop time, the record means assumes that the user is a new user, and records the user information of the user and the playback stop position information corresponding thereto.

According to the mode, if a new user uses the record medium, the playback stop position information is also recorded about the user.

In still another mode of the described information record and playback apparatus, the playback start control means has selection screen display means for making reference to the user information recorded on the record medium at the playback start time and if the playback stop position information related to the user playing back the record medium is recorded on the record medium, generating and displaying a selection screen for prompting the user to select either normal playback or playback based on the playback stop position information recorded about the user.

According to the mode, if the past playback stop position information is recorded about the user who attempts to play back the record medium, the user can select either playback starting at the past playback stop position or the normal playback.

In still another mode of the described information record and playback apparatus, the playback start control means has selection screen display means for making reference to the user information recorded on the record medium at the playback start time and if the playback stop position information related to the user playing back the record medium and that related to any other user are recorded on the record medium, generating and displaying a selection screen for prompting the user to select any of normal playback, playback based on the playback stop position information recorded about the user, or playback based on the playback stop position information recorded about the user last using the record medium.

According to the mode, if the past playback stop position information is also recorded about any other user than the user who attempts to play back the record medium, the user can select playback starting at his or her past playback stop position, the normal playback, or playback starting at the playback stop position of the user last using the record medium.

In still another mode of the described information record and playback apparatus, the playback start control means has selection screen display means for making reference to the user information recorded on the record medium at the playback start time and if only the playback stop position information related to any other user than the user playing back the record medium is recorded on the record medium, generating and displaying a selection screen for prompting the user to select either normal playback or playback based on the playback stop position information recorded about the user last using the record medium.

According to the mode, if the past playback stop position information is not recorded about the user who attempts to play back the record medium, the user can select the normal playback or playback starting at the playback stop position of the user last using the record medium.

In still another mode of the described information record and playback apparatus, the record means records date and time information indicating the date and time at which the user stopped playing back the record medium on the record medium in relation to the user information and the playback stop position information, and the selection screen display means makes reference to the date and time information and determines the playback stop position information recorded about the user last using the record medium.

According to the mode, the date and time information recorded on the record medium in relation to the user information and the playback stop position information is referred, whereby the playback stop position information of the user last using the record medium is determined.

In still another mode of the described information record and playback apparatus, the user information can be the user name previously registered in the information record and playback apparatus used by the user, the manufacturing number of the information record and playback apparatus, or arbitrary information previously defined in the information record and playback apparatus and set by the user. Accordingly, various pieces of information can be used as the user information.

According to another aspect of the invention, there is provided a computer program for causing a computer to function as a means for playing back information from a record medium; user information acquisition means for acquiring user information of the user using apparatus at present; record means for recording the acquired user information and playback stop position information on the record medium on the record medium in relation to each other; and playback start control means for selecting the playback stop position information corresponding to the acquired user information from among the playback stop position information read from the record medium and resuming playing back the record medium based on the selected playback stop position information.

As the computer program is executed on a computer, the described information record and playback apparatus can be implemented on the computer.

BRIEF DESCRIPTION OF THE DRAWINGS

In the accompanying drawings:

FIGS. 5A to 5C show examples of playback method selection screens displayed in the playback start time processing shown in FIG. 4.

DETAILED DESCRIPTION OF THE PREFERRED EMBODIMENTS

Referring now to the accompanying drawings, there is shown a preferred embodiment of the invention.

[1] Equipment Configuration

Figure 1:
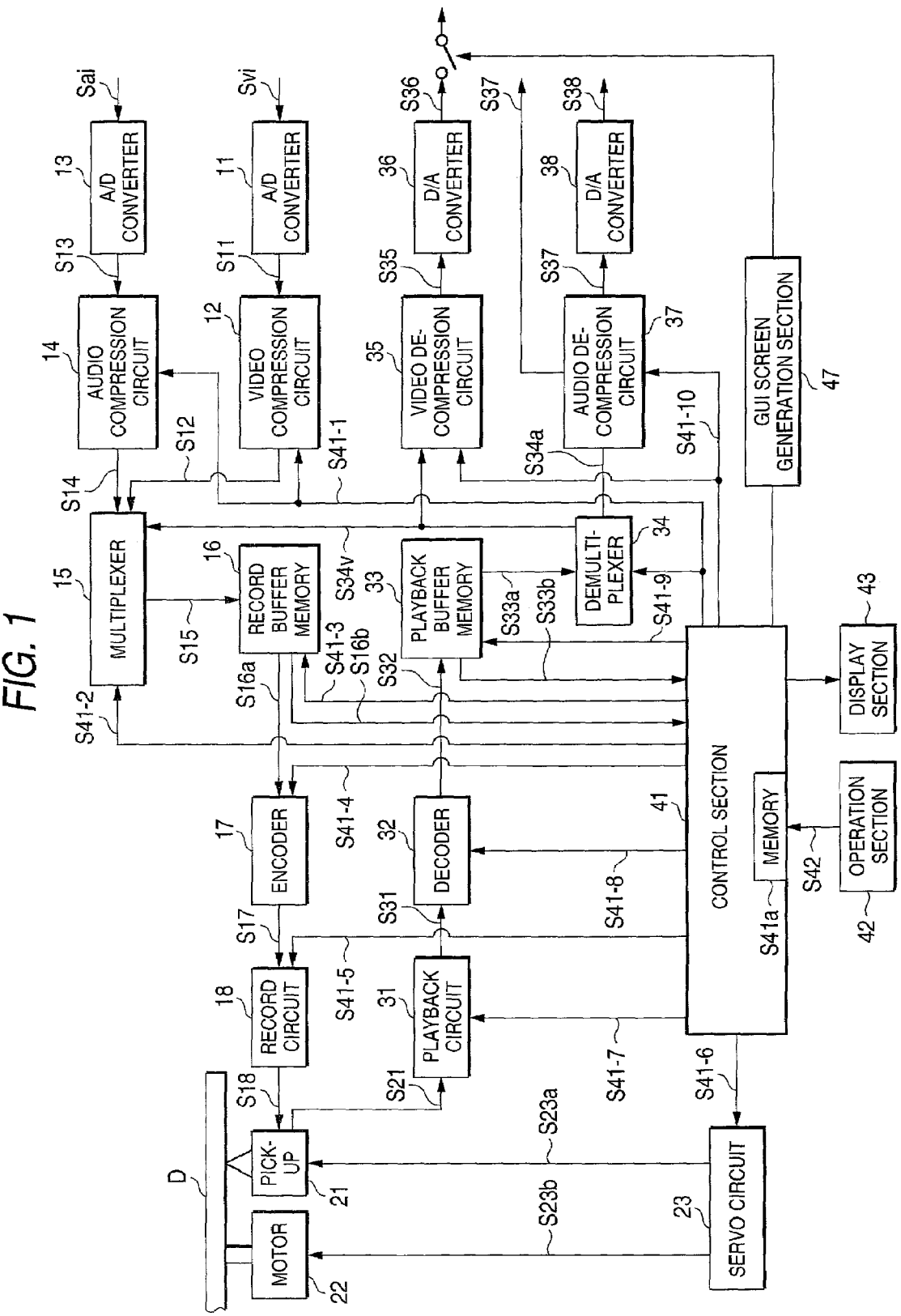
FIG. 1 is a block diagram to show the internal configuration of an information record and playback apparatus of the invention.

FIG. 1 is a block diagram to show the internal configuration of an information record and playback apparatus according to an embodiment of the invention.

An information record and playback apparatus 100 shown in FIG. 1 is used appropriately to record and playback an optical disk D and has an A/D converter 11 for converting an analog video input signal Svi into analog/digital (hereinafter called A/D) to generate and output digital video data S11. A video compression circuit 12 is connected to the output side of the A/D converter 11.

The video compression circuit 12 inputs the video data S11, forms a unit video block (VOBU) for every predetermined number of frames, and compresses the video data contained in the VOBU at a first compression ratio specified based on a control signal S41-1 (for example, performs variable-length coding based on MPEG2) to form a package in a predetermined information amount unit, for example, 2048 bytes, thereby generating compressed video data S12 for output.

The information record and playback apparatus 100 has an A/D converter 13 for A/D converting an analog audio input signal Sai into digital audio data S13 and outputting the audio data S13. An audio compression circuit 14 is connected to the output side of the A/D converter 13.

The audio compression circuit 14 inputs the audio data S13, forms a unit audio block (AAU) for every predetermined number of samples, and compresses the audio data contained in each AAU at a second compression ratio specified based on the control signal S41-1 (for example, performs fixed-length coding based on AC-3 system) to form a package in the above-mentioned predetermined information amount unit, thereby generating compressed audio data S14 for output.

A multiplexer 15 is connected to the output side of the video compression circuit 12 and the audio compression circuit 14. The multiplexer 15 has a function of inputting and time-division-multiplexing the compressed video data S12 and the compressed audio data S14 at a timing specified based on a control signal S41-2 to generate and output multiplexed data S15. The multiplexer 15 also has a function of inputting and time-division-multiplexing the compressed audio data S14 and given video data S34v at a timing specified based on the control signal S41-2 to generate and output multiplexed data S15. Record buffer memory 16 is connected to the output side of the multiplexer 15.

The record buffer memory 16 has a function of writing the multiplexed data S15 and outputting a data amount signal S16b indicating the storage amount of the multiplexed data S15 based on a third control signal S41-3 and reading the multiplexed data S15 and outputting multiplexed data S16a based on the control signal S41-3.

Connected to the output side of the record buffer memory 16 is an encoder 17 for encoding the multiplexed data S16a by a predetermined encode system based on a control signal S41-4 to generate encode data S17 (for example, performing 8/16 modulation for the multiplexed data S16a) and outputting the encode data S17. A record circuit 18 is connected to the output side of the encoder 17. The record circuit 18 inputs the encode data S17 and performs processing of power amplification, etc., to generate record data S18 based on a control signal S41-5, and outputs the record data S18. A pickup 21 is connected to the output side of the record circuit 18.

The pickup 21 has a function of optically recording the record data S18 on a record medium, for example, the optical disk D based on a control signal S23a and reading the recorded record data S18 and outputting a detection signal S21.

The optical disk D is rotated by a motor 22 controlled based on a control signal S23b. A servo circuit 23 for generating and outputting the control signals S23a and S23b based on a control signal S41-6 is connected to the pickup 21 and the motor 22.

A playback circuit 31 is connected to the output side of the pickup 21. The playback circuit 31 performs waveform-shaping of the detection signal S21 based on a control signal S41-7 to generate binary playback data S31 and outputs the binary playback data S31. A decoder 32 is connected to the output side of the playback circuit 31.

The decoder 32 has a function of decoding the playback data S31 by the decode system corresponding to the encode system of the encoder 17 (for example, performing 8/16 demodulation for the playback data S31) based on a control signal S41-8 to generate decode data S32, and outputting the decode data S32. Playback buffer memory 33 is connected to the output side of the decoder 32.

The playback buffer memory 33 has a function of inputting and writing the decode data S32 and outputting a data amount signal S33b indicating the storage amount of the decode data S32 based on a control signal S41-9. The playback buffer memory 33 also has a function of reading the decode data S32 and outputting decode data S33a based on the control signal S41-9. A demultiplexer 34 is connected to the output side of the playback buffer memory 33. The demultiplexer 34 inputs the decode data S33a and separates the decode data S33a into video data S34v and audio data S34a for output, based on a control signal S41-10.

A video decompression circuit 35 and the multiplexer 15 are connected to first output side of the demultiplexer 34. The video decompression circuit 35 has a video decompression buffer (not shown) for storing the video data S34v and based on a control signal S41-10, decompresses the video data S34v at the decompression ratio corresponding to the above-mentioned first compression ratio to generate and output a decompressed video data S35.

Connected to the output side of the video decompression circuit 35 is a digital-analog (D/A) converter 36 for converting the digital decompressed video data S35 into an analog video output signal S36 and outputting the video output signal S36. An audio decompression circuit 37 is connected to a second output side of the demultiplexer 34.

The audio decompression circuit 37 has an audio decompression buffer (not shown) for storing the audio data S34a and based on the control signal S41-10, decompresses the audio data S34a at the decompression ratio corresponding to the above-mentioned second compression ratio to generate and output decompressed audio data S37. Connected to the output side of the audio decompression circuit 37 is a D/A converter 38 for converting the digital decompressed audio data S37 into an analog audio output signal S38 and outputting the audio output signal S38.

A control section 41 is connected to the video compression circuit 12, the audio compression circuit 14, the multiplexer 16, the encoder 17, the record circuit 18, the servo circuit 23, the playback circuit 31, the decoder 32, the playback buffer memory 33, the demultiplexer 34, the video decompression circuit 35, and the audio decompression circuit 37.

The control section 41 comprises an MPU (microprocessing unit), etc., and executes a provided program, thereby controlling the respective section of the information record and playback apparatus 100. An operation section 42 for outputting a command signal S42 for giving an operation command based on the user's operation is connected to the control section 41. Also connected to the control section 41 is a display section 43 for displaying the operation state of the information record and playback apparatus 100, for example, the playback state, the record state, and the record/playback position (address) on the optical disk.

Further connected to the control section 41 is a GUI screen generation section 47 for generating a GUI screen (see FIGS. 5A to 5C) for prompting the user to select a playback operation mode (normal or resume) described later.

Output of the GUI screen generation section 47 is connected to one input terminal of a switch SW and output of the D/A converter 36 is supplied to the other input terminal of the switch SW. Accordingly, the switch SW selects either of the playback video signal of the optical disk D supplied from the D/A converter 36 and the GUI screen supplied from the GUI screen generation section 47 for output to a monitor (not shown).

The control section 41 has a function of generating and outputting the control signal S41-1, S41-2, S41-5, S41-6, S41-7, S41-8, S41-9, S41-10 based on the command signal S42 according to a program stored in internal memory 41a, outputting the control signal S41-3 based on the data amount signal S16b, and outputting the control signal S41-9 based on the data amount signal S33b. The control section 41 also functions as the control nucleus for controlling resume processing described later in detail.

[2] Resume Management Information

Figures 2, 3:
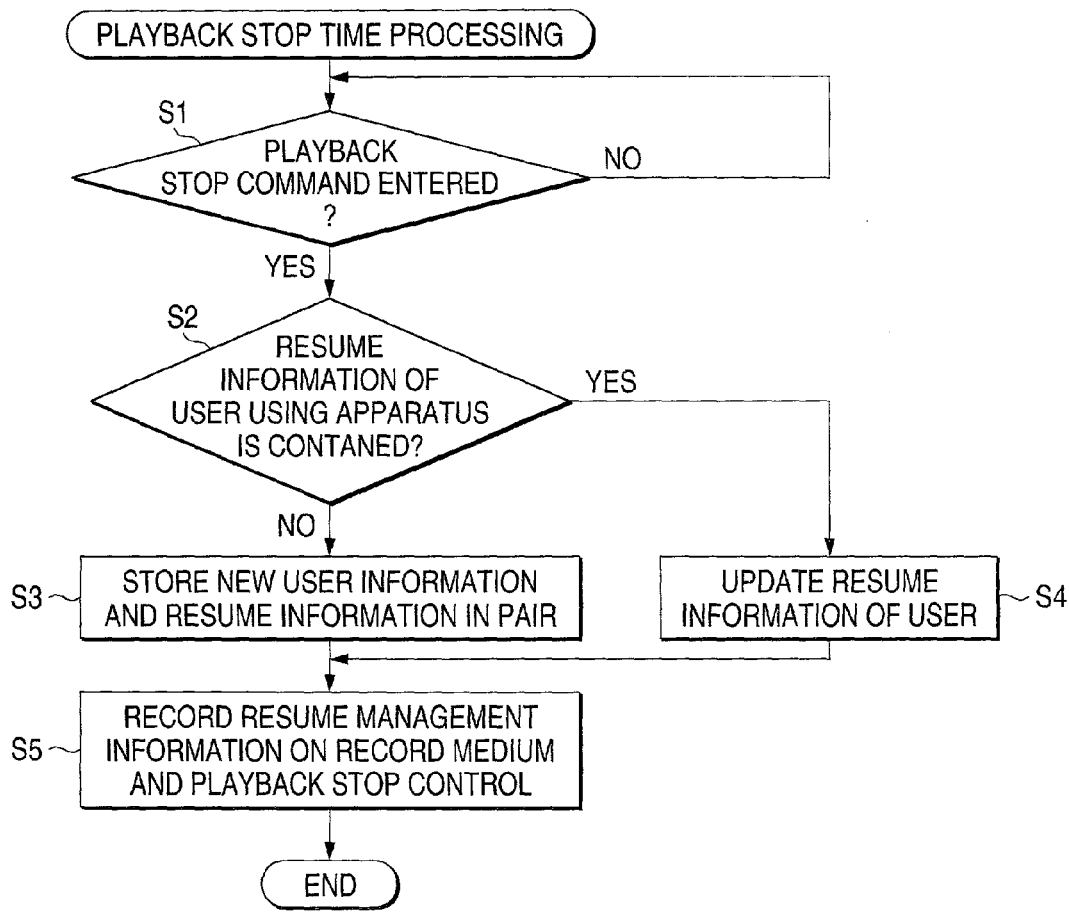
FIG. 2 shows an example of resume management information recorded on DVD.
FIG. 3 is a flowchart of playback stop time processing in resume playback in the invention.

FIG. 2 shows an example of resume management information recorded on the optical disk D. The resume information refers to position information on the optical disk at which playback was stopped (playback stop position information) if the user played back the optical disk in the past. As shown in the figure, the resume management information is classified according to user information and is recorded.

For each user, date and time information indicating the time when the resume information of the user was prepared is recorded. The resume information is position information on the optical disk when the user stopped playing back the optical disk, and usually can be an address, etc., on the optical disk.

The resume management information is recorded in a predetermined management information record area on the optical disk. When the user inserts the optical disk into the information record and playback apparatus 100 to play back the optical signal, the resume management information is read from the optical disk at later proper timing and is temporarily read into the memory 41a, etc., in the control section 41 of the information record and playback apparatus 100. When the user terminates playing back the optical disk or takes out the optical disk from the information record and playback apparatus 100 or powers off the apparatus, the resume management information is recorded from the memory 41a, etc., in the management information record area of the optical disk D.

[3] Resume Function

Next, playback processing using the resume function according to the invention will be discussed. The processing using the resume function of the invention is roughly classified into playback stop time processing and playback start time processing. The playback stop time processing is processing of saving resume information and writing the information onto a record medium when the user stops playing back the optical disk D. On the other hand, the playback start time processing is processing performed when one user starts playing back the optical disk D. The playback stop time processing and the playback start time processing will be discussed below in order:

The playback stop time processing and the playback start time processing described below are accomplished as the control section 41 including the MPU, etc., executes the provided program.

First, the playback stop time processing will be discussed with reference to FIG. 3, which is a flowchart of the playback stop time processing. It is assumed that when the processing in FIG. 3 is started, the information record and playback apparatus 100 recognizes the user information of the user using the information record and playback apparatus 100 at the point in time, who will also be hereinafter called the user using the apparatus. The information record and playback apparatus 100 can recognize the user information, for example, by prompting the user to enter his or her user information (ID number, name, etc.,) when the user uses the information record and playback apparatus 100 (specifically, for example, when the user turns on the power), and temporarily storing the entered user information in the memory 41a in the control section 41.

Now assuming that the information record and playback apparatus 100 is playing back the optical disk D, when the user enters a playback stop command (step S1), the control section 41 compares the user information of the user using the apparatus with the resume management information read from the optical disk D and recorded in the memory 41a, and determines whether or not the resume information of the user using the apparatus is contained in the resume management information (step S2).

If the resume information of the user using the apparatus is contained in the resume management information, it means that the user using the apparatus used the optical disk in the past, and then the control section 41 updates the resume information and the date and time information of the user in the resume management information (step S4). That is, the resume management information temporarily stored in the memory 41a is changed with the playback position applied when the user entered the playback stop command at step S1 as new resume information and the date and time as new date and time information.

On the other hand, if the resume information of the user using the apparatus is not contained in the resume management information, it means that the user using the apparatus is the user using the DVD initially, and then the user information of the user, the playback position information at the point in time entering the playback stop command, and the playback stop date and time are included in the resume management information (step S3).

The resume management information temporarily recorded in the memory 41a is recorded in the management information record area of the disk D and playback is stopped (step S5) and the processing is terminated. The playback stop time processing is now complete.

As the playback stop time processing is thus performed, for the user using the optical disk in the past, new resume information and date and time information are recorded as the resume management information. On the other hand, for the user using the optical disk initially, the user information, the resume information, and the date and time information are newly included in the resume management information. When the user enters a disk ejection command or a power off command, the resume management information may be recorded on the disk.

Figure 4:
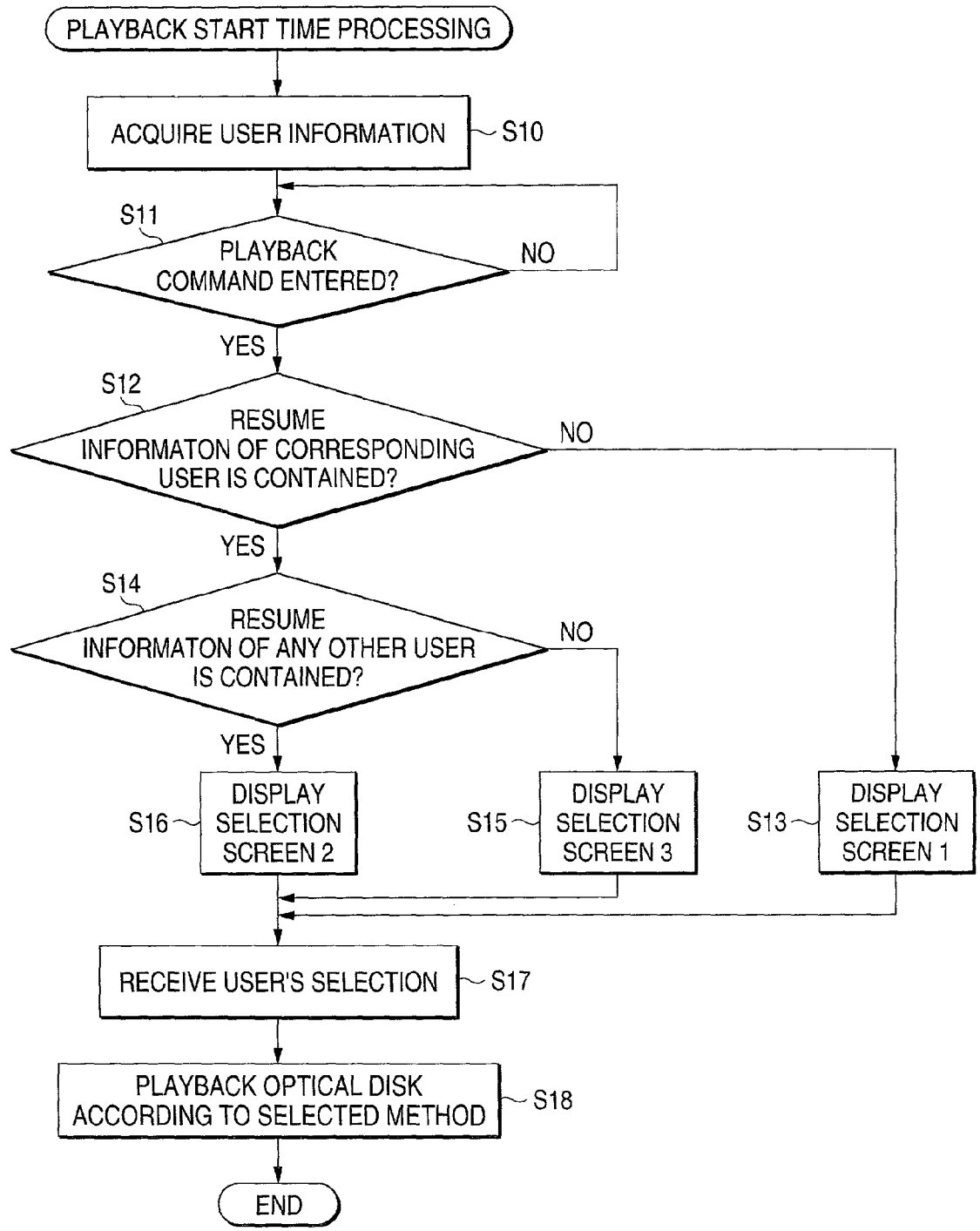
FIG. 4 is a flowchart of playback start time processing in resume playback in the invention.

Next, the playback start time processing will be discussed with reference to FIGS. 4 and 5. FIG. 4 is a flowchart of the playback start time processing and FIGS. 5A to 5C show display screen examples displayed on the monitor during the playback start time processing. The display screen examples shown in FIGS. 5A to 5C are playback method selection screens.

First, the user information of the user using the apparatus is acquired (step S10). The user information can be acquired, for example, by prompting the user to enter the user ID as described above. Next, the control section 41 determines whether or not the user enters a playback command (step S11). If a playback command is entered, the control section 41 compares the user information acquired at step S10 with the resume management information previously read from the optical disk D and stored in the memory 41a, and determines whether or not the resume information on the user using the apparatus is contained in the resume management information (step S12).

If the resume information is not contained in the resume management information (NO at step S12), it means that the user plays back the DVD initially, and then the control section 41 controls the GUI screen generation section 47 to display a selection screen 1 shown in FIG. 5A (step S13). On the selection screen 1, normal playback and resume playback are displayed and the user can select either of them. The normal playback is a method of playing back the optical disk starting at the top of the optical disk or the user-specified position as usual. On the other hand, the resume playback on the selection screen 1 is executed using the resume information of the user last playing back the optical disk. At this time, the control section 41 makes reference to the resume management information shown in FIG. 2 and executes resume playback based on the resume information corresponding to the most recent date and time information.

On the other hand, if the resume information on the user using the apparatus is contained in the resume management information (YES at step S12), the control section 41 determines whether or not the resume information of any other user than the user using the apparatus is contained in the resume management information (step S14).

If the resume information is not contained in the resume management information (NO at step S14), it means that only the resume information of the user using the apparatus is recorded on the optical disk, and then the control section 41 controls the GUI screen generation section 47 to display a selection screen 3 shown in FIG. 5C (step S15). The selection screen 3 contains normal playback and resume playback. The resume playback on the selection screen 3 is to resume playing back the optical disk at the position at which the user using the apparatus stopped playing back the optical disk in the past.

On the other hand, if the resume information on any other user than the user using the apparatus is contained in the resume management information (YES at step S14), the control section 41 controls the GUI screen generation section 47 to display a selection screen 2 shown in FIG. 5B (step S16). The selection screen 2 contains normal playback and two types of resume playback. One resume playback is to playback the optical disk using the resume information of the user and the other is to play back the optical disk using the resume information of the user last playing back the optical disk.

If the user thus selects a playback method in a state in which any of the selection screens 1 to 3 is displayed (step S17), the optical disk is played back according to the selected playback method (step S18).

As described above, in the invention, the user information is used to manage the resume information for each user, whereby reference to the resume information of any other person occurring as the record medium is lent or borrowed is circumvented. If the resume information recorded on the record medium differs from that of the current user using the apparatus, options of normal playback and resume playback are presented through the GUI requesting the user to select the playback mode, whereby it is made possible to play back the record medium as desired by the user.

In the playback start time processing shown in FIG. 4, if only the resume information of the user using the apparatus is recorded on the optical disk (Yes at step S14), options of normal playback and resume playback based on the resume information are presented (see FIG. 5C). In this case, automatically the optical disk can also be played back based on the resume information of the user without waiting for user's selection.

In the example, the user information is the user ID, etc., entered by the user himself or herself, but machine information of the information record and playback apparatus or the like can also be used as the user information. In this case, the information record and playback apparatus stores its machine information and thus the need for the user to enter the user information, for example, as shown in FIG. 4 is eliminated. As an alternative registration method of the user information, any button of a remote control can be pressed on a registration screen, the serial number of the machine can be used, or a random number can be entered for registering the user information.

In the example, the date and time information contained in the resume management information is referred and the resume information of the user using the disk most recently is used; instead, the resume information of the user using the disk most recently is always stored in the internal memory of the control section 41 or the like and can also be used to execute resume playback using the resume information of the user last using the disk.

In the embodiment, the invention is applied to the information record and playback apparatus such as an AV system, but the invention can also be applied to the information record and playback apparatus implemented by executing predetermined software on a computer such as a personal computer.

According to the described embodiment, only the resume function has been described by way of example, but the invention can be applied to every application in which chapter specification, thumbnail specification, image quality, sound quality, etc., is set for the information record and playback apparatus in user units.

The invention can be applied not only to DVD, but also to HDD as record media. Further, the invention can also be applied to audio video playback software operating on a computer, such as software for executing stream playback using the Internet, etc., in addition to video content and audio content as recorded and played-back information.

As described above, according to the invention, a plurality of pieces of playback stop position information are recorded in relation to the user information and playback is not resumed until the playback stop position information related to the user information becomes effective. Thus, reference to the resume information of any other person occurring as the record medium is lent or borrowed is inhibited and the inconvenience of starting playback based on the playback stop position information of any other person, losing the playback stop position information of any other person, or the like is eliminated.

The options of normal playback and resume playback are provided through the GUI (Graphical User Interface) when the playback stop position information recorded on the record medium corresponds to or does not correspond to the current user using the apparatus, so that convenience can be offered to the user.

FIG. 1

11 A/D CONVERTER
12 VIDEO COMPRESSION CIRCUIT
13 A/D CONVERTER
14 AUDIO COMPRESSION CIRCUIT
15 MULTIPLEXER
17 ENCODER
18 RECORD CIRCUIT
21 PICKUP
22 MOTOR
23 SERVO CIRCUIT
31 PLAYBACK CIRCUIT
32 DECODER
33 PLAYBACK BUFFER MEMORY
34 MULTIPLEXER
35 VIDEO DECOMPRESSION CIRCUIT
36 D/A CONVERTER
37 AUDIO DECOMPRESSION CIRCUIT
38 D/A CONVERTER
41 CONTROL SECTION
41a memory
42 operation section
43 display section
47 GUI SCREEN GENERATION SECTION

FIG. 2

USER INFORMATION RESUME INFORMATION DATE AND TIME INFORMATION

FIG. 3

PLAYBACK STOP TIME PROCESSING
S1 PLAYBACK STOP COMMAND ENTERED?
S2 IS RESUME INFORMATION OF USER USING APPARATUS CONTAINED?
S3 STORE NEW USER INFORMATION AND RESUME INFORMATION IN A PAIR
S4 UPDATE RESUME INFORMATION OF THE USER
S5 RECORD RESUME MANAGEMENT INFORMATION ON RECORD MEDIUM AND PLAYBACK STOP CONTROL
END

FIG. 4

PLAYBACK START TIME PROCESSING
S10 ACQUIRE USER INFORMATION
S11 PLAYBACK COMMAND ENTERED?
S12 IS RESUME INFORMATION OF THE CORRESPONDING USER CONTAINED?
S13 DISPLAY SELECTION SCREEN 1
S14 IS RESUME INFORMATION OF ANY OTHER USER CONTAINED?
S15 DISPLAY SELECTION SCREEN 3
S16 DISPLAY SELECTION SCREEN 2
S17 RECEIVE USER'S SELECTION
S18 PLAY BACK OPTICAL DISK ACCORDING TO SELECTED METHOD
END

FIGS. 5A–5C

SELECTION SCREEN 1

SELECT PLAYBACK METHOD
  1. NORMAL PLAYBACK
  2. RESUME PLAYBACK
    RESUME INFORMATION OF LAST USER

SELECTION SCREEN 2

SELECT PLAYBACK METHOD
  1. NORMAL PLAYBACK
  2. RESUME PLAYBACK
    RESUME INFORMATION OF USER USING APPARATUS
  3. RESUME PLAYBACK
    RESUME INFORMATION OF LAST USER

SELECTION SCREEN 3

SELECT PLAYBACK METHOD
  1. NORMAL PLAYBACK
  2. RESUME PLAYBACK
    RESUME INFORMATION OF USER USING APPARATUS

What is claimed is:

1. An information record and playback apparatus comprising:
   a user information acquisition unit adapted to acquire user information of a user using said apparatus at present;
   a record unit adapted to record the acquired user information and a record medium playback stop position information on the record medium in relation to each other; and
   a playback start controller adapted to select the playback stop position information corresponding to the acquired user information from among the playback stop position information read from the record medium and resuming playing back the record medium based on the selected playback stop position information.

2. The information record and playback apparatus as claimed in claim 1 wherein if the playback stop position information corresponding to the user using said apparatus is recorded on the record medium at the playback stop time, said record unit updates the playback stop position information.

3. The information record and playback apparatus as claimed in claim 1 wherein if the playback stop position information corresponding to the user using said apparatus is not recorded on the record medium at the playback stop time, said record unit assumes that the user is a new user, and records the user information of the user and the playback stop position information corresponding thereto.

4. The information record and playback apparatus as claimed in claim 1 wherein said playback start controller has a selection screen display unit adapted to reference the user information recorded on the record medium at the playback start time and if the playback stop position information related to the user playing back the record medium is recorded on the record medium, generati ng and dis playing a selection screen for prompting the user to select either normal playback or playback based on the playback stop position information recorded about the user.

5. The information record and playback apparatus as claimed in claim 1 wherein said playback start controller has a selection screen display unit adapted to reference the user information recorded on the record medium at the playback start time and if the playback stop position information related to the user playing back the record medium and that related to any other user are recorded on the record medium, generating and displaying a selection screen for prompting the user to select any of normal playback, playback based on the playback stop position information recorded about the user, or playback based on the playback stop position information recorded about the user last using the record medium.

6. The information record and playback apparatus as claimed in claim 1 wherein said playback start controller has a selection screen display unit adapted to reference the user information recorded on the record medium at the playback start time and if only the playback stop position information related to any other user than the user playing back the record medium is recorded on the record medium, generating and displaying a selection screen for prompting the user to select either normal playback or playback based on the playback stop position information recorded about the user last using the record medium.

7. The information record and playback apparatus as claimed in claim 5 wherein said record unit records date and time information indicating the date and time at which the user stopped playing back the record medium on the-record medium in relation to the user information and the playback stop position information, and wherein the selection screen display unit references the date and time information and determines the playback stop position information recorded about the user last using the record medium.

8. The information record and playback apparatus as claimed in claim 1 wherein the user information is the user name previously registered in the information record and playback apparatus used by the user, the manufacturing number of the information record and playback apparatus, or arbitrary information previously defined in the information record and playback apparatus and set by the user.

9. The information record and playback apparatus as claimed in claim 1 wherein the acquired user information and playback stop position information are recorded in a predetermined management information record area on the record medium.

* * * * *